United States Patent
Abe et al.

(10) Patent No.: US 7,347,958 B2
(45) Date of Patent: *Mar. 25, 2008

(54) OXIDE SINTERED BODY AND SPUTTERING TARGET, AND MANUFACTURING METHOD FOR TRANSPARENT CONDUCTIVE OXIDE FILM AS ELECTRODE

(75) Inventors: Yoshiyuki Abe, Chiba-ken (JP); Noriko Ishiyama, Chiba-ken (JP); Go Ohara, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/599,109

(22) Filed: Nov. 14, 2006

(65) Prior Publication Data

US 2007/0057239 A1 Mar. 15, 2007

Related U.S. Application Data

(63) Continuation of application No. 10/694,704, filed on Oct. 28, 2003, now Pat. No. 7,141,186.

(30) Foreign Application Priority Data

Oct. 29, 2002 (JP) .............................. 2002-314864

(51) Int. Cl.
*H01B 1/08* (2006.01)
*C23C 14/08* (2006.01)

(52) U.S. Cl. .............................. 252/520.2; 204/192.15; 204/192.29

(58) Field of Classification Search ............. 252/520.2; 204/192.1, 192.15, 192.29
See application file for complete search history.

(56) References Cited

FOREIGN PATENT DOCUMENTS

| JP | 59-204625 | | 11/1984 |
|---|---|---|---|
| JP | 7-054132 | | 2/1995 |
| JP | 7-54132 | * | 2/1995 |
| JP | 9-209134 | * | 8/1997 |
| JP | 2003-324825 | | 11/2003 |

OTHER PUBLICATIONS

Japan Society for the Promotion of Science Committee No. 166. on Transparent Oxide Optical and Electrical Materials. Technology OF Transparent Conducting Films. 1999.
John L. Vossen. RF Sputtered Transparent Conductors The System $In_2O_3$-$SnO_2$. RCA Review, vol. 32 Jun. 1971 pp. 289-296.
Mirozova et al. "Physicochemical study of a saturated solid solutionb in the indium oxide (In-2O3)-titanium dioxide system . . . " Zhurnal Prikladnoi Khimii (Russian) 65(9), 1992, 2138-40.
Campet et al. "The Electronic Effect of Titanium (4+) and germanium (4+) dopings upon the physical properties of indium (III) oxide . . . " Mat. Sci and Eng, B B19(3), 285-9 (1993).

* cited by examiner

*Primary Examiner*—Mark Kopec
(74) *Attorney, Agent, or Firm*—Katten Muchin Rosenman LLP

(57) ABSTRACT

An oxide sintered body for sputtering target is provided wherein the main component is indium oxide, and it contains titanium such that the atomic ratio of Ti/In is 0.003 to 0.120, and the specific resistance is 1 kΩm or less.

9 Claims, No Drawings

OXIDE SINTERED BODY AND SPUTTERING TARGET, AND MANUFACTURING METHOD FOR TRANSPARENT CONDUCTIVE OXIDE FILM AS ELECTRODE

CROSS REFERENCE TO RELATED APPLICATION

This application is a continuation of U.S. application Ser. No. 10/694,704 filed Oct. 28, 2003, now U.S. Pat. No. 7,141,186 and claims priority from Japanese Patent Application Number 2002-314864 filed Oct. 29, 2002, the contents of which are herein incorporated by reference.

BACKGROUND OF THE INVENTION

1. Field of the Invention

This invention relates to an oxide sintered body that is used when manufacturing a low-resistant transparent conductive film using a direct-current sputtering method, and a sputtering target based on the oxide sintered body, and a method of manufacturing a transparent conductive film based on the oxide sintered body, and particularly to an oxide sintered body and sputtering target that is used for sputtering and ion plating film formation used for manufacturing a low-resistant transparent conductive film having good permeation characteristics in the infrared range.

2. Description of the Related Art

A transparent conductive film has high conductivity and high transmittance in the visible light range. Besides being used in electrodes for solar batteries, liquid-crystal elements and other kinds of light-receiving elements, transparent conductive film is also used as heat-reflecting film for automobile windows and buildings, as anti-static film and in various kinds of anti-fog transparent heating elements for refrigerated showcases.

Tin oxide ($SnO_2$) containing antimony or fluorine as a dopant, zinc oxide (ZnO) containing aluminum or gallium as a dopant or indium oxide ($In_2O_3$—Sn) containing tin as a dopant are widely used for transparent conductive film. Particularly, indium oxide film containing tin as a dopant, or in other words $In_2O_3$—Sn film, called ITO (indium tin oxide) film is often used because a low-resistant film can easily be obtained.

Low-resistant transparent conductive film is optimally used in electrode of touch panels, solar batteries, liquid crystals, organic electroluminescence and inorganic electroluminescence.

Sputtering is often used as the method for manufacturing these transparent conductive films. The sputtering method is an effective method when forming a film using materials having low vapor pressure, or when it is necessary to precisely control the film thickness, and since operation is very simple, it is widely used industrially.

In the sputtering method, the raw material that will be the component of the objective film is used as a sputtering target. In this method, a vacuum apparatus is generally used, and after a high vacuum is reached, a noble gas such as argon gas is introduced, and under a gas pressure of approximately 10 Pa or less, the substrate is taken to be the anode and the sputtering target is taken to be the cathode, and a glow discharge is caused to occur between these to generate argon plasma, and to cause the positive argon ions in the plasma to collide with the cathode or sputtering target, and the particles of the target component that are caused to break away by this are deposited on the substrate to form a film.

The sputtering method can be classified according to the method used for generating the argon plasma; where the radio-frequency (RF) sputtering method uses radio-frequency plasma, and the direct-current (DC) sputtering method uses direct-current plasma.

Generally, the direct-current sputtering method is widely used in industry because its speed of formation for the film is faster than that of the radio-frequency sputtering method, the power-supply equipment is inexpensive and the operation for forming the film is simple. However, in the direct-current sputtering method it is necessary to use a conductive target, whereas in the radio-frequency sputtering method it is possible to form the film even with a non-conductive material.

The speed of formation of the film for the sputtering method is closely related to the chemical bonds of the target material. Sputtering is a phenomenon that occurs when positive argon ions having kinetic energy collide with the surface of the target and the matter on the surface of the target receives that energy and breaks and flies off, and the weaker the bonds are between the ions or atoms of the target material the greater the probability of the material breaking apart and flying off due to sputtering.

Looking at a solar battery that uses transparent conductive film, solar batteries comprise laminated layers of p-type and n-type semiconductors, and are classified according to the type of semiconductors. The most widely used solar batteries are those that use silicon that is safe and very abundant. Furthermore, even among solar batteries that use silicon, there are three types: single-crystal silicon, polycrystal silicon and amorphous silicon. Also, development of solar batteries called chemical-compound thin-film solar batteries, which use compound semiconductors such as $CuInSe_2$, GsAs or CdTe, is being performed.

In any type of solar battery, there must be a transparent conductive film for the electrode on the top surface that comes in contact with the light, and ITO film or zinc oxide (ZnO) film that has been doped with aluminum or gallium have been used. The properties desired in this transparent conduction films are low resistance and high transmittance of sunlight.

In Japanese Patent Application No. 2003-324825, the inventors made it clear that an indium oxide thin film containing titanium can be used as a transparent electrode for a solar battery. Not only does this thin film have low resistance and high transmittance in the visible light range, but it also has high transmittance in the infrared light range when compared with ITO film or zinc-oxide type film. By using this kind of transparent conductive film in the electrode on the top surface of a solar battery, it is also possible to effectively use infrared energy. This titanium-added indium-oxide thin film is excellent in that it can be manufactured using the direct-current sputtering method, and can use technology that is widely used in industry.

However, when taking productivity and lowering the cost of manufacturing into consideration, in the case of performing high-speed film formation by applying high direct-current power, arcing occurs in the sputtering target used for manufacturing the titanium-added indium-oxide thin film when the high direct-current power is applied, and it was found that high-speed film formation became impossible. Arcing during film formation causes the generation of particles, which causes a decrease in product yield. Furthermore, if arcing occurs continuously, formation of the film itself is hindered.

Moreover, as the sputtering target is used in sputtering, it gradually becomes pitted, however, the fact that its sputtering characteristics are constant up until just before being all used up, is useful from the aspect of material costs. However, in the case of the sputtering targets that have been used up until now for manufacturing titanium-added indium-oxide thin film, problems occur in that nodules (black protrusions on the target surface) are formed on the sputter surface of the sputtering target as the integrated value of the applied power increases, arcing occurs, and there is a decrease in the film formation speed.

A sintered body target to which high direct-current power could be applied in this way and for which stable direct-current sputtering could be performed to the end did not actually exist.

For a sputtering target for which arcing occurs on a small scale, arcing can be avoided by using a power supply having an arcing control function. As method the for controlling arcing, there is the DC pulsing method (method of neutralizing the charge on the target by periodically stopping the negative voltage applied to the target and applying a low positive voltage during that time), and there is a method of installing an arc-blocking circuit (a circuit that detects an increase in the discharge current when arcing occurs, and stops the power supply before it can grow into full arcing, then restarts the power supply after the current flowing to the target drops sufficiently) (refer to 'Transparent Conductive Film Technology', Ohmsha, pg. 193 to 195). These methods belong to the direct-current sputtering method because the direct-current discharge is basically utilized in them. However, a power supply having these functions is very expensive, so there is a problem in that it causes an increase in equipment costs. Also, even when a power supply with these functions is used, it does not mean that arcing can be completely controlled.

A titanium-added indium-oxide film formed using the sputtering method has been known. For example, the oldest example is disclosed in a document by J. L. Vossen (RCA Review, 1971, Vol. 32, pg. 289 to 296). This document centers on a description of the characteristics of ITO film that is formed by RF sputtering, and gives a manufacturing example of $In_2O_3$ film to which 20 Mole % of $TiO_2$ is added as an impurity other than tin.

However, in this structure, there is a large amount of Ti added and the form of its existence is unclear, and the electrical resistivity of the film is given as $7.5 \times 10^{-1}$ Ωcm, which is very high. The specific resistance, surface roughness and density of the sputtering target used are not given.

Moreover, Japanese patent publication No. Tokukai Sho 59-204625 discloses a method of using a sputtering method to manufacture an indium-oxide film containing titanium on a polyethylene terephthalate film from a indium-oxide target containing 2 wt. % to 15 wt. % of titanium oxide. However, the amount of titanium added is large and the form of its existence is unclear, and the specific resistance, surface roughness and density of the oxide sintered body is not given at all, and there is no mention of high-speed film formation, the occurrence of nodules, and stable sputtering over a long period of time.

SUMMARY OF THE INVENTION

Taking the problems mentioned above into consideration, an object of this invention is to provide a titanium-added indium-oxide sintered body target that has high transmittance in not only the visible light range but also the infrared light range, and that is used for manufacturing an oxide transparent electrode film having low resistance, and that is formed by direct-current sputtering using a power supply that has no arching-control function, and for which it is difficult for arcing to occur even when high voltage is applied, and that can be formed at high speed without arcing occurring even when power is applied for a long period of time.

DESCRIPTION OF THE PREFERRED EMBODIMENTS

The main component of the titanium-added indium-oxide type sintered body of this invention is indium oxide, and it contains titanium such that the atomic ratio of the titanium content Ti/In is 0.003 to 0.120, and the specific resistance is 1 kΩcm or less.

Furthermore, it is preferred that the specific resistance be $1 \times 10^{-2}$ Ωcm or less.

Also, it is preferred that the atomic ratio of the titanium content Ti/In be 0.003 to 0.019.

Further, it is desired as to the content of tin, which is an impurity, that the atomic ratio of the tin content Sn/In be 0.0025 or less.

Moreover, the main phase is only the crystal phase of indium oxide having a bixbyite-type structure with titanium contained in solid solution (the titanium cations replace a part of the indium cations of the bixbyite indium oxide to form $(In, Ti)_2O_{3-x}(x.0)$), or a mixture of the crystal phase of indium oxide having a bixbyite type structure with titanium contained in solid solution and the crystal phase of an indium titanate compound.

The titanium-added indium-oxide sintered body of this invention is manufactured with indium-oxide powder and titanium-oxide power having an average particle size of 1 μm or less as raw materials, and mixed in a wet ball mill, then formed using a cold isostatic press and sintered under oxygen-control.

Also, it is preferred that the titanium oxide crystal phase not be detected by powder x-ray diffraction measurement, and that the relative density be 95% or greater.

Moreover, it is preferred that the surface roughness Rmax of the surface on the side where sputtering is performed be 3.0 μm or less.

For the sputtering target of this invention, the oxide sintered body is applied to a metal plate for cooling. This sputtering target can be used for a transparent conductive film the specific resistance of which is $1 \times 10^{-3}$ Ωcm or less, or for production of a transparent conductive film the specific resistance of which is $5.5 \times 10^{-4}$ Ωcm or less.

This sputtering target can be used for a transparent conductive film in which the average transmittance of infrared rays in the wavelength range from 1000 nm to 1400 nm is at least 60% for the film itself.

In the manufacturing method of the oxide transparent electrode film of this invention, the film is formed using the sputtering target as mentioned above and a DC sputtering method.

The present invention is further detailed

The sintered body target of this invention comprises indium, titanium and oxygen. When using the sintered target to manufacture the film by sputtering, titanium ions, having an atomic valence of four, occupy as impurity ions part of the position of the indium, having an atomic valence of three, and this discharges carrier electrons and increases the conductivity of the film. Normally, when impurity ions increase in an n-type semiconductor such as indium oxide, the number of carrier electrons increases, however, due to the scattering of the impurity ions, the mobility of the carrier electrons tends to decrease.

As to the film of crystalline pure zirconium oxide produced by sputtering etc., the mobility according to the Hall effect measurement is 20 cm$^2$/V sec, 30 cm$^2$/V sec while the mobility of the single crystal of pure indium oxide is about 160 cm$^2$/V sec. Therefore, the mobility of the film of crystalline pure indium oxide produced by sputtering etc. is much lower than that of the single crystal.

However, according to tests by the inventor, when titanium is added to indium oxide as impurity ions, it became clear that it is possible to greatly increase the mobility. Therefore, by containing titanium element in the indium oxide film, the mobility of the carrier electrons is relatively high (from 70 cm$^2$/V sec to 90 cm$^2$/V sec) and it is possible to increase the number of carrier electrons. However, generally, an extreme increase in carrier electrons increases reflection and absorption of infrared rays by the carrier electrons, and thus there is an extreme reduction of transmittance of the infrared rays (refer to 'Transparent Conductive Film Technology', Ohmsha, pg. 55 to 57). For example, in the case of ITO film, the number of carrier electrons increases by the addition of tin, and thus the conductivity increases, however, a large decrease in transmittance of infrared rays is observed. Also, when the amount of tin added is controlled to a level that does not have an adverse effect on the transmittance of infrared rays, the number of carriers is small, and conductivity drops.

According to tests by the inventors, it was made clear that when titanium was added to indium oxide film as impurity ions, it was possible to increase the mobility of the carrier electrons without greatly increasing the number of carrier electrons, and thus it is possible to form a transparent conductive film having low resistance and high infrared transmittance.

The oxide sintered body of the present invention is used for raw material in production of the transparent conductive film having such characteristics. This is the main reason for including the element titanium in the sintered body of indium oxide.

In order to manufacture a practical low-resistance film, it is preferred that the amount of titanium contained in the sintered body of indium oxide be such that the atomic ratio Ti/In be in the range from 0.003 to 0.120. When the ratio is less than 0.003, there is no large effect on the number and mobility of carrier electrons in the film due to the addition of titanium, so it is not possible to obtain a film having low resistance, and when the ratio exceeds 0.120, there is a remarkable decrease in the mobility of the carrier electrons in the obtained film and the conductivity drops. Also, within that structure, when the atomic ratio Ti/In is in the range of 0.003 to 0.019, it is possible to stably obtain a transparent conductive film that has even lower resistance and higher transmittance of infrared rays.

In order to stably manufacture the transparent conductive film that has low resistance and high transmittance of infrared rays, it is desirable that the element tin contained as an impurity in the oxide sintered body is restricted in amount such that the atomic ratio Sn/In is 0.0025 or less, and it is further desirable that substantially no tin is contained in the oxide sintered body. As to the element tin, an impurity, in the sintered body, if the atomic ratio Sn/In is more than 0.0025, the absorption of infrared rays is outstandingly affected by the carrier electrons produced by the tin contained in the transparent conductive film, so that the transmittance of infrared rays is easily reduced. In such a case, it is possible to increase the transmittance of infrared rays by increasing the amount of oxygen in sputtering to suppress the production of carrier electrons. However, excessive increase of oxygen in amount in sputtering causes scattering of neutral impurities which in turns causes reduction of mobility so as to increase the specific resistance. Therefore, the amount of oxygen added in sputtering gas must be precisely adjusted to obtain the transparent conductive film having low resistance and high transmittance of infrared rays. When the atomic ratio Sn/In is controlled to be 0.0025 or less for the element tin contained as an impurity in the sintered body, the effects by the carrier electrons produced by the tin contained in the transparent conductive film is small, so that the transparent conductive film with low resistance and high transmittance of infrared rays can be stably manufactured in the broader range of amount of oxygen added to the sputtering gas.

Moreover, in one embodiment of the invention, the specific resistance of the oxide sintered body is regulated. This is because the speed of formation of the film during direct-current sputtering depends on the specific resistance of the oxide sintered body of the sputtering target. In the case of a oxide sintered body that contains indium and titanium, when the specific resistance is up to 1 kΩcm, or more preferably, up to $1 \times 10^{-2}$ Ωcm, a fast speed of film formation can be obtained. When the specific resistance is high, and when a reduction process is performed by heating under a non-oxidation atmosphere such as nitrogen or the like, it is possible to lower the specific resistance of the oxide sintered body.

Also, the inventors found that when forming a film using by direct-current sputtering and by using an oxide sintered body comprising a main component of indium oxide and containing titanium as the sputtering target, the occurrence of arcing greatly depends on how the titanium exists in the sintered body, and particularly a lot of arcing occurs when a titanium-oxide crystal phase exists. Furthermore, they found that when an oxide sintered body essentially consisting of only a bixbyite crystal phase with no titanium-oxide crystal phase, or of a bixbyite crystal phase and indium titanium compound crystal phase with no titanium-oxide crystal phase is used as the sputtering target, no arcing occurred.

It is thought that this is based on that fact that the titanium-oxide crystal phase, which is the main cause of arcing, is high-resistance phase, and that the bixbyite crystal phase and indium titanate compound crystal phase are conductive phases. Also, it is thought that this is based on the fact that it is difficult to effectively lower the specific resistance even when performing a heating reduction process, as mentioned above, in a non-oxidation atmosphere such as nitrogen when there is a titanium-oxide crystal phase in the oxide sintered body.

Whether or not there is formation of an indium titanate compound crystal phase depends on the amount of titanium contained in the oxide sintered body. When there is a small amount of titanium, an indium titanate compound crystal phase is not formed, and only the bixbyite crystal phase occurs, and when there is a large amount of titanium, an indium titanate compound crystal phase is formed and increases with the amount of titanium.

However, it was made clear from tests performed by the inventors that whether or not there is formation of an indium titanate compound crystal phase largely depends on not only the amount of titanium contained in the oxide sintered body, but also on the manufacturing conditions of the oxide sintered body, for example, the particle size, mixing conditions and sintering conditions of the raw powder material.

Moreover, it was also found from tests performed by the inventors that whether or not there is formation of a titanium-oxide crystal phase, which is the cause of arcing, depends on the manufacturing conditions of the oxide sintered body, for example, the particle size, mixing conditions and sintering conditions of the raw power material.

It was made clear that by optimizing these manufacturing conditions of the oxide sintered body it is possible to suppress formation of the titanium-oxide crystal phase.

A test performed by the inventors also revealed that the speed of the film formation by sputtering under the same sputtering conditions greatly depended on the constituent crystal phase(s) of the oxide sintered bodies, even when the oxide sintered bodied had almost same specific resistance. Much higher speed of the film formation could be obtained from the target of the oxide sintered body without the titanium-oxide than the target of the oxide sintered body containing the titanium-oxide(s). Thus, by using the target of oxide sintered body consisting of only the bixbyite crystal phase(s) or by using the target of oxide sintered body consisting of only the bixbyite crystal phase(s) and the indium titanium compound crystal phase(s). This is because the sputtering rate of a titanium-oxide crystal phase is relatively slow, so when there is titanium-oxide crystal phase in the oxide sintered body, the sputtering rate becomes slow in proportion to the amount of the crystal phase existing in the oxide sintered body.

Here, the bixbyite type structure is a crystal structure of the indium-oxide ($In_2O_3$), and it is also called a C-type rare-earth oxide (see Transparent Conductive Film Technology, Ohmsha, pg. 82). The indium-oxide ($In_2O_3$) can take a corundum type structure other than the bixbyite type structure. The cations of titanium replace the indium of the indium-oxide in the bixbyite type structure, to form a solid solution.

As an indium titanate compound, the $In_2TiO^5$ compound that is described in JCPDS card 30-640, and $In_2Ti_2O_{7-x}$ (x, 0) compounds of the pyrochlore type structure are known, however, other compounds that contain titanium, indium and oxygen could be used. Also, there is no problem even if structure is a little different from the stoichiometric composition of these, or if the part of the indium is replaced with other ions (for example, quaternary or higher valence cations). In tests performed by the inventors, it was found that the indium titanate compound crystal phase has lower resistance than the titanium-oxide crystal phase, and even when high direct-current power is applied to it, it does not cause arcing to occur, and does not cause the speed for formation of the film to drop.

Also, according to tests performed by the inventors, a sputtering target having little formation of nodules (black colored protrusions produced on the target surface) and that has no problem with the occurrence of arcing or lowered film formation speed, has a relative density of 95% or greater, and more preferably, a surface roughness Rmax of the sputter surface of 3.0 µm or less.

The relative density of the oxide sintered body here is obtained on the basis of the density of the sintered body measured by way of the Archimedes method using water, and the theoretical density on the premise that no pore is contained in the sintered body, and a value calculated through the formula of (the density of the sintered body/the theoretical density)×100%. The theoretical density of the compositions used to calculate the relative density is calculated as follows;

Provided that all of the indium in the oxide sintered body form the phase of indium oxide of the bixbyite type, that there is no oxygen vacancy in the indium oxide phase, and that all of the titanium existing in the oxide sintered body occupy normal indium sites by replacement, the mass (M) of the unit cell of the bixbyite type structure is obtained, and the volume (V) of the unit cell of the bixbyite type structure is obtained by way of calculation using the lattice constant obtained through the powder x-ray diffraction method, resulting in the theoretical density of M/V.

Here, the surface roughness Rmax is the distance value between two straight lines that : (1) are parallel to the average line of a cross-section curve taken through just the standard length, (2) come in contact with this cross-section curve, and (3) are located generally on both sides of this cross-section curve. The standard length is based on the JIS standards, and six values are determined according to the Rmax value. For example, when Rmax is 0.8 µm to 6.3 µm, the standard length is 0.8 mm, and when Rmax is 6.3 µm to 25 µm, the standard length is 2.5 mm. Moreover, the average line is a line (straight line or curved line) that has the geometrical shape of the measured surface on the extracted cross-section curve, and is set such that the square sum of the deviation from that line to the cross-section curve becomes a minimum. In this invention, Rmax is the average value found from measurements made at ten locations under the above conditions.

In the oxide sintered body used in manufacturing the transparent conductive thin film of this invention, when the relative density became lower than 95% and sputtering was performed for a long period of time, nodules (black colored protrusions produced on the target surface) occurred in near the erosion, and it became easy for arcing to occur during film formation. When film is formed in this kind of state, it is not possible to obtain a low-resistance film. From tests performed by the inventors, it was found that the ease, at which nodules occur, is related to the relative density of the oxide sintered body and surface roughness of the sputter surface. In the oxide sintered body of this invention, the relative density is 95% or greater, and more preferably, the surface roughness Rmax of the sputter surface is 3.0 µm or less. This is effective in suppressing the occurrence of nodules and arcing when sputtering is performed over a long period of time.

The reason for this is explained below. When the relative density is low (90% to 95%), elements or particles are thrown from the surface of the sputtering target by sputtering, and the outer appearance looks as if the sputtering target has been shaved away, and, when this happens, air holes that exist in the sputtering target appear on the target surface, and these air holes form concave sections on the target surface. The sputtered elements or particles adhere to and accumulate on the walls of these concave sections on the target surface, and grow to protrusions. In the case where the target surface is rough, which can be said that such concave sections were already formed on the surface, protrusions having the same structure as described above are formed. The lower the relative density of the sputtering target is, or the larger the surface roughness is, the more of these concave sections there are that are formed on the target surface, and thus more protrusions are formed. The protrusions formed on surface of the target are the black colored protrusions as mentioned above. As these protrusions grow, plasma becomes concentrated on them during electric discharge, and the occurrence of arcing or lowering of the film formation speed begins, causing a worsening of the film characteristics.

Also, the inventors performed continuous sputtering tests and evaluation experiments using titanium-added indium oxide sintered bodies having various relative densities and surface roughness for the sputtering target, where gas pressure, type of film-formation gas, distance between the target and substrate and film-formation power are fixed. From these tests and experiments, it was found that the amount of occurrence of black colored protrusions on the target surface and the integrating applied power that starts the occurrence of arcing and the lowering of the film-formation speed, depend largely on the relative density and surface roughness of the sputtering target. In other words, as the relative density becomes higher and the surface roughness becomes less, the occurrence of black colored protrusions becomes less, and the value of integrating applied power at which arcing occurs and lowering of the film-formation speed begins becomes higher.

Therefore, by using a sputtering target manufactured from the oxide sintered body of this invention, it is possible to manufacture a low-resistance transparent conductive film, which has not only good light transmittance in the visible light range but also in the infrared light range, on a substrate, using the direct-current sputtering method, faster than with conventional techniques. Moreover, there is no change in the sputtering characteristics even when sputtering is performed for a long period of time, and since the sputtering target can be used stably until it is completely used up, so manufacturing costs can be greatly reduced.

EXAMPLES

Next, the invention will be explained in details using examples.

1. Relationship Between the Titanium-oxide Crystal Phase and the Film-formation Speed Example 1

The raw powder materials used were $In_2O_3$ powder having an average particle size of 1 μm or less, and $TiO_2$ powder having an average particle size of 1 μm or less. The $In_2O_3$ powder and $TiO_2$ powder were blended in a ratio (weight ratio) of 94.2 to 5.8, and placed in a plastic pot together with water and mixed using a wet-type bowl mill with a hard $ZrO_2$ bowl for 18 hours. After mixing, the slurry was removed, filtered, dried and granulated.

A compact is formed by placing the granulate in a cold isostatic press under a pressure of 3 tons/cm².

Next, the compact was sintered as follows. The compact was sintered at 1450. for 20 hours in an atmosphere where oxygen was supplied to the air inside the sintering furnace at a ratio of 5 liters per 0.1 m³ of the volume of the furnace. When doing this, the temperature was raised at 1./min, then during cooling after sintering, the oxygen supply inside the sintering furnace was stopped and the temperature was lowered to 1000. at 10./min.

Scrap portions of the obtained sintered body were pulverized, then powder x-ray diffraction measurement was performed. As for an oxide sintered body having an atomic ratio Ti/In of 0.01, only a diffraction peak caused by the indium-oxide crystal phase in the bixbyite-type structure was observed. Using EMPA, TEM, ED (electron diffraction), it was found from local analysis of this sintered body that there was no titanium-oxide phase such as $TiO_2$, $Ti_2O_3$ or TiO, and that titanium was incorporated in In-site position of the bixbyite-type indium-oxide phase.

The obtained oxide sintered body was processed to a size of 152 mm width and 5 mm thickness, and the sputter surface is ground and polished using a cup grinding stone. The surface resistance of the sputter surface of the oxide sintered body was measured using four-probe measurement, and the specific resistance was determined from the surface resistance and the thickness. The specific resistance was 1.0 kΩcm. This processed oxide sintered body was then bonded to an oxygen-free copper backing plate using metallic indium to form the sputtering target.

The sputtering target was attached to the cathode for non-magnetic targets of a direct-current magnetron sputtering apparatus having a direct-current power supply with no arcing-control function, and a glass substrate was placed in a position such that it faced the sputtering target. A mark was made with a felt pen on the glass substrate at the part located directly above the center of the sputtering target. Also, the distance between the target and the substrate was 60 mm, pure Ar gas was supplied and mixed with just 4% $O_2$ gas to create a gas pressure of 0.5 Pa, then direct-current plasma was generated at a direct current of 160 W and sputtering was performed for 30 minutes with the substrate statically facing the sputtering target with no heating of the substrate.

After the film was formed, the felt pen mark and the film that was deposited above it were removed using acetone, and the unevenness that occurred, or in other words, the film thickness was measured using a surface roughness gage. The formation speed of the film was calculated from the film thickness divided by the formation time.

Also, in order to check the electrical and optical characteristics of the film, substrate that was not marked with a felt pen was heated to a substrate temperature of 300., and transparent conductive film having a film thickness of about 200 nm was formed, and the surface resistance of the film was measured using the four-probe measurement method, and the specific resistance was calculated and found to be $5.0 \times 10^{-4}$ Ωcm.

Furthermore, the optical characteristics were measured using a spectrophotometer (manufactured by Hitachi Ltd.), to obtain the transmittance (T1) of the film plus substrate and the transmittance (T2) of the substrate only, and then the calculation of (T1/T2)×100(%) was conducted to obtain the transmittance of the film only, resulting in the infrared light transmittance of the transparent conductive film in the wavelength range from 1000 nm to 1400 nm was high, 85%.

Examples 2 to 8

Similar to example 1, an oxide sintered body having an atomic ratio Ti/In of 0.003, 0.008, 0.015, 0.019, 0.051, 0.102 and 0.119 was manufactured. As for the oxide sintered body having an atomic ratio Ti/In of 0.003, 0.008, 0.015, 0.019, XRD diffraction peaks caused only by the indium oxide phase having bixbyite-type structure were observed. As for the other oxide sintered bodies, XRD diffraction peaks caused by the bixbyite-type indium-oxide phase, and the indium titanate $In_2TiO_5$ phase given in JCPDS card 30-640 were observed. However the diffraction peak caused by titanium oxide such as $TiO_2$, $Ti_2O_3$ or TiO was not observed in all the oxide sintered body. Using EMPA, TEM, ED (electron diffraction), it was found from local analysis of this sintered body that there was no titanium-oxide phase such as $TiO_2$, $Ti_2O_3$ or TiO, and that titanium was incorporated in In-site position of the bixbyite-type indium-oxide phase.

Moreover, sputtering targets were manufactured and measured using the same process as described for example 1 from the obtained oxide sintered body.

As a result, the specific resistance of all of the films was $1 \times 10^{-3}$ Ωcm or less, the film was a low-resistance transparent conductive film having high transmittance in the visible light range as well as the infrared light range.

Particularly in the case of the film manufactured from a sputtering target from an oxide sintered body (examples 2, 3) having an atomic ratio Ti/In of 0.003 to 0.019, the average transmittance of infrared light (wavelength: 1000 nm-1400 nm) of the film (200 nm thick) measured in the method as in Example 1 was high at 85% or greater, and the specific resistance was low, at $1.9 \times 10^{-4}$ Ωcm to $5.5 \times 10^{-4}$ Ωcm.

Table 1 shows the measurement results of the film-formation speed under the same sputtering conditions when using targets manufactured from oxide sintered bodies of examples 1 to 6, and the atomic ratio Ti/In and specific resistances of the oxide sintered bodies.

TABLE 1

| | Atomic Ratio of Ti/In in Oxide Sintered body | Specific Resistance of Oxide Sintered Body (Ωcm) | Film-formation Speed (nm/min) |
|---|---|---|---|
| Example 1 | 0.010 | 1.0k | 48 |
| Example 2 | 0.003 | 0.9k | 49 |
| Example 3 | 0.008 | 0.9k | 49 |
| Example 4 | 0.015 | 0.7k | 50 |
| Example 5 | 0.019 | 0.3k | 51 |
| Example 6 | 0.051 | 0.5k | 53 |
| Example 7 | 0.102 | 0.3k | 54 |
| Example 8 | 0.119 | 0.5k | 55 |

Comparative Examples 1 to 8

The oxide sintered bodies of comparative examples 1 to 8 containing indium and titanium were manufactured under the same conditions as examples 1 to 8 except that $TiO_2$ powder, having an average particle size of 3 μm to 5 μm, was used, and that the mixing time of the raw powder materials by the wet-type bowl mill was shortened to 5 hours.

Powder x-ray diffraction measurement was performed on the obtained oxide sintered bodies, and they were observed by a transmission electron microscope, Electron Diffraction, and from local analysis using EPMA, and it was found that the oxide sintered bodies contained a $TiO_2$ phase, and since the specific resistances of these oxide sintered bodies was in the range of 13 kΩcm to 35□Ωcm, it was confirmed that they differed from the oxide sintered bodies of this invention.

The oxide sintered bodies were ground and polished using the same method as was used for examples 1 to 8, and bonded to an oxygen-free copper backing plate.

Furthermore, sputtering film formation was performed under the same conditions as for examples 1 to 8, and the film-formation speed was measured and the specific resistance and optical characteristics of the film were measured using the same methods.

Table 2 shows the measurement results of the film-formation speed when using targets manufactured from oxide sintered bodies of comparative examples 1 to 8, and the atomic ratios Ti/In and specific resistances of the oxide sintered bodies.

TABLE 2

| | Atomic Ratio of Ti/In in Oxide Sintered body | Specific Resistance of Oxide Sintered Body (Ωcm) | Film-formation Speed (nm/min) |
|---|---|---|---|
| C-Example 1 | 0.010 | 13k | 39 |
| C-Example 2 | 0.003 | 25k | 38 |
| C-Example 3 | 0.008 | 19k | 39 |
| C-Example 4 | 0.015 | 21k | 38 |
| C-Example 5 | 0.019 | 24k | 35 |
| C-Example 6 | 0.051 | 35k | 37 |
| C-Example 7 | 0.102 | 33k | 40 |
| C-Example 8 | 0.119 | 30k | 25 |

(C = Comparative)

Characteristics of the Thin Films Obtained

The films obtained from the oxide sintered bodies of comparative examples 1 to 8 were low-resistance transparent conductive film having specific resistances that were less than $1 \times 10^{-3}$ Ωcm, which is about 20 to 30% higher than those of the films obtained from oxide sintered bodies having the same composition as those of examples 1 to 8, and good light transmittance in both the visible light range and infrared light range.

However, when comparing the film-formation speeds in Table 1 and Table 2, the formation speeds of the sputtering targets manufactured from the oxide sintered bodies of this invention that were having only bixbyite phase or having a mixture of bixbyite phase and indium titanate compound crystal phase (Table 1), were remarkably faster than the film-formation speeds of the sputtering targets manufactured from oxide sintered bodies containing a titanium-oxide crystal phase (Table 2), so it can be seen that this invention is greatly useful from an aspect of productivity.

2. Reduction Process (When Titanium Oxide is Not Detected)—Specific Resistance

Examples 9 to 40

Next, oxide sintered bodies manufactured from examples 1 to 8 and containing indium and titanium, which have an indium-oxide crystal phase of bixbyite-type structure containing titanium in solid solution, or a mixture of an indium-oxide crystal phase of bixbyite-type structure containing titanium in solid solution and indium titanate compound crystal phase, were heated in a vacuum and subjected to reduction processing to control the specific resistance. The annealing process temperature was 700 □, and by varying the annealing time within the range hours 1 to 10 hours, oxide sintered bodies having various specific resistances were obtained. For examples 9 to 16, the annealing time was 1 hour, for examples 17 to 24, the annealing time was 2 hours, for examples 25 to 32, the annealing time was 5 hours, and for examples 33 to 40, the annealing time was 10 hours.

It was confirmed by powder X-ray diffraction measurement that the crystal phases of the oxide sintered bodies did not change by the annealing process. After the annealing process, the oxide sintered bodies were ground and polished using the same method as in examples 1 to 8, and then bonded to oxygen-free copper backing plates to manufacture the sputtering targets. Using these sputtering targets, direct-current sputtering was performed under the same conditions as in examples 1 to 8, the film-formation speeds were measured.

The measurement results are shown in Table 3.

TABLE 3

| | Atomic Ratio of Ti/In in Oxide Sintered body | Specific Resistance of Oxide Sintered Body (Ωcm) | Film-formation Speed (nm/min) |
|---|---|---|---|
| Example 9 | 0.003 | 15 | 52 |
| Example 10 | 0.008 | 17 | 53 |
| Example 11 | 0.010 | 10 | 53 |
| Example 12 | 0.015 | 23 | 52 |
| Example 13 | 0.019 | 43 | 56 |
| Example 14 | 0.051 | 24 | 54 |
| Example 15 | 0.102 | 30 | 56 |
| Example 16 | 0.119 | 60 | 55 |
| Example 17 | 0.003 | $9 \times 10^{-2}$ | 58 |
| Example 18 | 0.008 | $6 \times 10^{-1}$ | 59 |
| Example 19 | 0.010 | $7 \times 10^{-1}$ | 58 |
| Example 20 | 0.015 | $4 \times 10^{-2}$ | 55 |
| Example 21 | 0.019 | $6 \times 10^{-1}$ | 59 |
| Example 22 | 0.051 | $9 \times 10^{-2}$ | 58 |
| Example 23 | 0.102 | $8 \times 10^{-2}$ | 58 |
| Example 24 | 0.119 | $5 \times 10^{-2}$ | 57 |
| Example 25 | 0.003 | $7 \times 10^{-3}$ | 63 |
| Example 26 | 0.008 | $8 \times 10^{-3}$ | 65 |
| Example 27 | 0.010 | $9 \times 10^{-3}$ | 64 |
| Example 28 | 0.015 | $6 \times 10^{-3}$ | 63 |
| Example 29 | 0.019 | $3 \times 10^{-3}$ | 62 |
| Example 30 | 0.051 | $8 \times 10^{-3}$ | 65 |
| Example 31 | 0.102 | $7 \times 10^{-3}$ | 63 |
| Example 32 | 0.119 | $8 \times 10^{-3}$ | 64 |
| Example 33 | 0.003 | $8 \times 10^{-4}$ | 68 |
| Example 34 | 0.008 | $5 \times 10^{-4}$ | 66 |
| Example 35 | 0.010 | $9 \times 10^{-4}$ | 65 |
| Example 36 | 0.015 | $6 \times 10^{-4}$ | 67 |
| Example 37 | 0.019 | $3 \times 10^{-4}$ | 68 |
| Example 38 | 0.051 | $5 \times 10^{-4}$ | 66 |
| Example 39 | 0.102 | $4 \times 10^{-4}$ | 66 |
| Example 40 | 0.119 | $6 \times 10^{-4}$ | 67 |

From Table 3 it can be seen that the film-formation speed increases by annealing, and that as the specific resistance of the oxide sintered body is lower, the film-formation speed increases. Also, by making the specific resistance of the oxide sintered body less than $1 \times 10^{-2}$ Ωcm (example 25 to 40), even faster film formation is possible.

Characteristics of the Thin Films Obtained

The films obtained from the sputtering targets using the oxide sintered body of examples 9 to 40 were low-resistance transparent conductive film that had specific resistances up to $1 \times 10^{-3}$ Ωcm, and had high light transmittance in both the visible light range and infrared light range. Particularly, the films manufactured from sintered body targets (examples 9 to 13, 17 to 21, 25 to 29 and 33 to 37) having atomic ratios Ti/In of 0.003 to 0.019, the average infrared light transmittance of the film (200 nm thick) in the wavelength range from 1000 nm to 1400 nm measured as in example 1 was high at 60% or greater, and the specific resistance was low at $1.9 \times 10^{-4}$ Ωcm to $5.5 \times 10^{-4}$ Ωcm.

The atomic ratio of Sn/In of the oxide sintered body of Examples 9 to 40 above is less than 0.0001 through measurement in the ICP atomic emission spectroscopy. So, it can be said that substantially no amount of Sn, an impurity, is contained in the oxide sintered body. However, by sintering in the furnace contaminated by Sn constituent, oxide sintered bodies containing Sn impurity with Sn/In atomic ratio from 0.001 to 0.015 were produced. Sputtering targets were produced from five kinds of oxide sintered bodies, being different in Sn/In atomic ratio, specifically 0.001, 0.0025, 0.008, 0.011 and 0.15 in atomic ratio, respectively, and having the common Ti/In atomic ratio of 0.019, and the common specific resistance of about $3 \times 10^{-3}$ Ω cm, and transparent conductive films were produced with film thickness of 500 nm by way of sputtering under the same condition. These sputtering targets were subjected to the same measurement method of average transmittance of infrared rays as in example 1 for comparison. The average transmittance of infrared rays in the wavelength range from 1000 nm to 1400 nm was decreased as the atomic ratio of Sn/In in the sintered body was increased. Reduction in average transmittance of infrared rays was large in the films produced from the sintered bodies being 0.011 or larger in Sn/In atomic ratio, and the average transmittance of infrared rays in the wavelength range from 1000 nm to 1400 nm measured by the same method as in example 1 was lower, specifically 55% or less, but it was possible by increasing the amount of oxygen in sputtering gas to obtain films which were good in average transmittance of infrared rays in the wavelength range from 1000 nm to 1400 nm. If the atomic ratio of Sn/In is 0.0025 or less, the films with high average transmittance (60% or greater) of infrared rays can be stably produced in the broad range of oxygen amount in sputtering. So, it will be noticed that this range of atomic ratio (Sn/In) is more effective in the stable production of the transparent conductive film having high transmittance of infrared rays.

3. Reduction Processing (When Titanium Oxide is Detected)—Specific Resistance

Examples 41 to 56

Next, after manufacturing oxide sintered bodies containing indium and titanium and containing a titanium-oxide crystal phase under the same manufacturing conditions as comparative examples 1 to 8, an annealing process was performed in a vacuum, and the specific resistance was controlled. The temperature of the annealing process was 700, and by varying the annealing time within the range of 2 hours to 5 hours, oxide sintered bodies having various specific resistances were obtained.

The annealing time for examples 41 to 48 was 2 hours, and the annealing time for examples 49 to 56 was 5 hours.

It was confirmed by powder x-ray diffraction measurement that the crystal phase of the oxide sintered bodies were not changed by the annealing process, or in other words, it was confirmed that the titanium-oxide crystal phase existed. The titanium-oxide phase in the oxide sintered bodies of examples 41 to 48 was a mixture of $TiO_2$ and $TiO$, and that in the oxide sintered bodies of examples 49 to 56 was $TiO$. The oxide sintered bodies were ground and polished after the annealing process by the same method as for examples 1 to 8, and then they were bonded to an oxygen-free copper backing plate to form the sputtering targets. Direct-current sputtering was performed using these sputtering targets under the same conditions as for the examples 1 to 8, and the film-formation speeds were measured.

The measurement results are shown in Table 4.

TABLE 4

| | Atomic Ratio of Ti/In in Oxide Sintered body | Specific Resistance of Oxide Sintered Body (Ωcm) | Film-formation Speed (nm/min) |
|---|---|---|---|
| Example 41 | 0.003 | 0.6k | 48 |
| Example 42 | 0.008 | 0.8k | 47 |
| Example 43 | 0.010 | 0.4k | 48 |
| Example 44 | 0.015 | 0.6k | 47 |
| Example 45 | 0.019 | 0.5k | 47 |
| Example 46 | 0.051 | 0.8k | 47 |
| Example 47 | 0.102 | 0.9k | 48 |

TABLE 4-continued

|  | Atomic Ratio of Ti/In in Oxide Sintered body | Specific Resistance of Oxide Sintered Body (Ωcm) | Film-formation Speed (nm/min) |
|---|---|---|---|
| Example 48 | 0.119 | 0.8k | 48 |
| Example 49 | 0.003 | 19 | 51 |
| Example 50 | 0.008 | 40 | 52 |
| Example 51 | 0.010 | 20 | 52 |
| Example 52 | 0.015 | 17 | 50 |
| Example 53 | 0.019 | 25 | 51 |
| Example 54 | 0.051 | 44 | 51 |
| Example 55 | 0.102 | 35 | 50 |
| Example 56 | 0.119 | 36 | 50 |

Characteristics of Thin Films Obtained

The films obtained from the sputtering targets of examples 41 to 56 were low-resistance transparent conductive films having specific resistances up to $1\times10^{-3}$ Ωcm and high transmittance in both the visible light range and infrared light range.

For an oxide sintered body of indium and titanium containing a titanium-oxide crystal phase, lowering of the resistance by annealing in a vacuum was limited to a few tens of Ωcm.

In the film-formation experiments described above, comparisons were made of the film-formation speeds at a direct current of 160 W, however the same tendency was also seen in sputtering film formation when the applied direct-current power was increased to 300 W and 500 W. Also, the exact same tendency was seen in film-formation using radio-frequency sputtering as well, and it was shown that the sputtering target of this invention made of an oxide sintered body having a specific resistance regulated according to the present invention has a practical and useful film-formation speed.

4. Amount of Oxygen Mixed in the Sputtering Gas

Examples 57 to 47, Comparative Example 9

Next, the relationship between the specific resistance of the film and the specific resistance of the sintered body target was investigated for when the amount of oxygen mixed in the sputtering gas during sputtering was changed. The sputtering targets described above (sintered body targets of examples, 5, 13, 21, 29, 37 and comparative example 5, having various specific resistances) were attached to the cathode for non-magnetic targets of the direct-current magnetron sputtering apparatus used in examples 1 to 42. A glass substrate was placed in the apparatus such that the distance between the target and the substrate was 60 mm, and the glass substrate was stationary, facing the target, then pure Ar gas was supplied, and $O_2$ gas mixed into the gas in the range 0% to 15%, and at a gas pressure of 0.5 Pa, direct-current plasma was generated at a DC 160 W, the glass substrate was heated to 300 and sputtering was performed for 10 minutes. The amount of $O_2$ gas mixed in the sputtering gas was varied within the range 0% to 15%, and a transparent conductive film was manufactured on the glass substrate, and the dependence of the specific resistance of the film on the amount of $O_2$ gas mixed in was investigated.

The specific resistance of the film depended on the amount of $O_2$ gas mixed in the sputtering gas. As the amount of $O_2$ gas was increased, the specific resistance of the manufactured film decreased. At a certain amount of $O_2$ gas, the specific resistance of the film reached a minimum value, and as the amount of $O_2$ gas was further increased, the specific resistance of the film showed a tendency to increase.

Using the sintered body targets of examples 5, 13, 21, 29, 37 and comparative example 5 having an atomic ratio Ti/In of 0.019 and various specific resistances, the dependence of the specific resistance of the obtained film on the amount of $O_2$ gas mixed in the sputtering gas was investigated for these conditions. The minimum value (ρmin) of the specific resistance of the film, and the amount of $O_2$ gas mixed in the sputtering gas at that time, and the amount of $O_2$ gas mixed in sputtering gas when the specific resistance of the film was increased within 10% of the minimum specific resistance (in other words, 1.1 ρmin) were found experimentally.

The measurement results are shown in Table 5.

TABLE 5

|  | Spec. Res. of Oxide Sintered Body (ΩΩcm) | Minimum Value of Spec. Res. of Film (ρmin, Ωcm) | Range of Amount $O_2$ gas mixed for Spec. Res. of Film up to 1.1 ρmin |
|---|---|---|---|
| Example 57 | 0.3k | $2.5 \times 10^{-4}$ | 4.6% |
| Example 58 | 43 | $2.2 \times 10^{-4}$ | 4.9% |
| Example 59 | $6 \times 10^{-1}$ | $2.1 \times 10^{-4}$ | 5.10% |
| Example 60 | $3 \times 10^{-3}$ | $1.8 \times 10^{-4}$ | 5.12% |
| Example 61 | $3 \times 10^{-4}$ | $1.5 \times 10^{-4}$ | 6.14% |
| C-Example 9 | 24k | $3.2 \times 10^{-4}$ | 3.5% |

(C = Comparative)
(Spec. Res. = Specific Resistance)

Characteristics of the Thin Films Obtained

As shown in Table 5, the lower the specific resistance of the oxide sintered body is within the range of this invention, the lower the specific resistance of the obtained film is. Also, since the range of the amount of oxygen mixed into the sputtering gas in which a low resistance film can be obtained is large, it was found that a low resistance film with good reproducibility could be obtained, which is advantageous from the aspect of productivity.

Exactly the same tendency was seen in the case of oxide sintered bodies having Ti/In atomic ratios of 0.003, 0.008, 0.015, 0.051, 0.102 and 0.119. As the specific resistance of these oxide sintered bodies became low, the specific resistance of these films became low, and their range of the oxygen amount in the sputtering gases in which a low-resistance film can be obtained became large.

5. Relationship Between the Sintered Body Density and Surface Roughness of the Sputter Surface and Arcing and Nodules Examples 62 to 66, Comparative Examples 10 to 17

Oxide sintered bodies with the atomic ratio Ti/In of 0.019 having various relative densities were obtained in the same way as example 3 except for changing the pulverization mixing time of the raw powder materials by the bowl mill and the sintering temperature and sintering time. Sputtering targets whose surfaces having various values of surface roughness Rmax were obtained by grinding and polishing process using various types of cup grinding stone. The value of the surface roughness Rmax was measured based on the JIS standards mentioned above, and the average value measured at ten locations on the sputter surface was determined as Rmax of the oxide sintered body.

A sintered body target having an atomic ratio Ti/In of 0.019 was attached to the cathode of a direct-current magnetron sputtering apparatus. Direct-current plasma was generated under the conditions that the distance from the target to the substrate was 70 mm, sputtering gas was the mixture of 95% Ar gas and 5% $O_2$ gas, and sputtering gas pressure was 0.5 Pa, and sputtering power was DC 500 W. The total applied power from the start of continuous sputtering until arcing began to occur was estimated, and the deepest depth of erosion (distance from the deepest depth of erosion to the opposite surface of a target) when arcing began was measured. When doing this test, a conventional DC power supply that does not have an arcing-control function was used for sputtering. Moreover, the characteristics: (1) film-formation speed, (2) specific resistance of the film and (3) average transmittance of the film (wavelength: from 400 nm to 800 nm) in the initial and final stages of film formation were measured (film-formation speed test, film characteristics test).

The measurement results are shown in Table 6.

TABLE 6

| | Relative Density (%) | Rmax (μm) | Total Applied Power (kWh) | Deepest Depth of Erosion (mm) |
|---|---|---|---|---|
| Example 62 | 99 | 1.6 | — | |
| Example 63 | 98 | 2.7 | — | |
| Example 64 | 96 | 3.0 | — | |
| Example 65 | 95 | 2.7 | — | |
| Example 66 | 95 | 3.0 | — | |
| C-Example 10 | 98 | 3.3 | 15 | 1.2 |
| C-Example 11 | 97 | 3.1 | 15 | 1.3 |
| C-Example 12 | 95 | 3.5 | 12 | 2.1 |
| C-Example 13 | 95 | 3.6 | 12 | 2.1 |
| C-Example 14 | 95 | 6.0 | 10 | 2.8 |
| C-Example 15 | 93 | 4.2 | 9 | 3.2 |
| C-Example 16 | 90 | 7.1 | 8 | 3.5 |
| C-Example 17 | 72 | 12.0 | 5 | 3.3 |

(C = Comparative)
(— = No arcing is caused until the deepest depth of erosion becomes 1 mm.)

Film-formation Speed and Characteristics of the Thin Films Obtained

For the sputtering targets of examples 62 to 66, arcing did not occur, and no black colored protrusions is formed on the surface even at the end of continuous sputtering as the total applied power was increased. Therefore, it was possible to use the sputter targets completely to the end. In the case of each of the characteristics (1) to (3) mentioned above, there was hardly any change from the initial stage of film formation even when the total applied power increased, and the desired low resistance ($3 \times 10^{-4}$ Ωcm or less) and high transmittance of visible light (85% or greater) was obtained.

On the other hand, as for the arcing test results under the same conditions using the sputtering targets of comparison examples 10 to 17, arcing occurred and a large amount of black colored protrusions was formed on the sputtered surface of the oxide sintered body in every comparison examples as the total applied power increased. Therefore, it had to be stopped to manufacture the film.

For example, in the case of a direct-current sputtering (using a direct-current power supply with no arcing-control function) of an oxide sintered body target containing a $TiO_2$ phase, arcing began to occur when the power exceeded 500 W. The frequency of arcing increased as the specific resistance of the oxide sintered body increased. The sputtered surface after arcing test was observed by SEM and analyzed by EPMA. It was found that the arcing marks traveled from the $TiO_2$ phase, so arcing was caused by the $TiO_2$ phase.

As can be seen from Table 6, when the surface roughness Rmax of the target surface of the oxide sintered body is greater than 3.0 μm, arcing occurred when sputtering was performed for a long time. However, when the surface roughness Rmax of the target surface was 3.0 μm or less, arcing did not occur when sputtering was performed for a long time, and the 5 mm thick sputtering target could be used to the end.

The occurrence of arcing is related not only to the surface roughness Rmax of the target surface of the oxide sintered body, but also to the relative density of the oxide sintered body. It was found that arcing could not occur not only when the surface roughness Rmax of the target surface of the oxide sintered body was up to 3.0 μm, but also when the relative density of the oxide sintered body was at least 95%, even when sputtering was performed for a long period of time.

When frequent arcing began, a large amount of nodules formed near the target erosion, and the specific resistance and transmittance of visible light of the manufactured film became much worse than film that was manufactured when arcing did not occur. In the case of the films that were manufactured using the sputtering targets of comparative examples 10 to 17, the specific resistance and light transmittance of the films depended on the total applied sputtering power, and there was a tendency for them to decrease, particularly in the case when arcing occurred, the specific resistance and transmittance became extremely bad.

With this invention, when a sputtering target is used where the relative density of the oxide sintered body is 95% or greater, and the surface roughness Rmax of the target surface is 3.0 μm or less, it is difficult for arcing to occur, and the sputtering target can be used to the very end. Also, when using the sputtering target of this invention, the specific resistance of the film and the transmittance in the visible light range is constant and good to the end.

Table 6 shows the measurements results for a sintered body target having an atomic ratio Ti/In of 0.019, however, exactly the same results are obtained even when using sintered body targets having atomic ratios Ti/In of 0.003, 0.008, 0.010, 0.015, 0.051, 0.102 or 0.119 are used, and it was found that the surface roughness of the surface of the sputtering target and the relative density of the sputtering target regulated by this invention are important factors.

When using the oxide sintered body of this invention as a sputtering target, film can be formed faster than with conventional techniques. Furthermore, using the oxide sintered body of this invention, it is possible to manufacture a transparent conductive oxide film as electrode having the characteristics of high transmittance in not only the visible light range but also the infrared light range, and low resistance by conventional direct-current sputtering in which no arcing-control function is used. Moreover, using the oxide sintered body of this invention, it is possible to manufacture a transparent conductive oxide film as electrode by a industrially useful sputtering method without the occurrence of arcing even when power is applied for a long period of time.

Therefore, it is possible to manufacture highly efficient solar batteries at low cost, and so this invention has very high industrial value.

What is claimed is:
1. An oxide sintered body consisting essentially of:
indium oxide, and titanium,
wherein the titanium is contained such that an atomic ratio of Ti/In is in a range of greater than 0.019 to 0.120,
wherein the specific resistance is $1 \times 10^{-2}$ Ohm cm or less, wherein the oxide sintered body comprises a main phase of one of a crystal phase of indium oxide having a bixbyite type structure with titanium contained in solid solution, and of a mixture of a crystal phase of indium oxide having a bixbyite type structure with titanium contained in solid solution and a crystal phase of an indium titanate compound, and wherein a crystal phase of titanium oxide is not detected by powder X-ray diffraction measurement.

2. The oxide sintered body of claim 1, wherein the relative density is 95% or greater.

3. The oxide sintered body of claim 1, wherein a surface roughness Rmax of the surface on a side where sputtering is performed is 3.0 µm or less.

4. A sputtering target, comprising:

an oxide sintered body consisting essentially of indium oxide, and titanium, wherein the titanium is contained such that an atomic ratio of Ti/In is in a range of greater than 0.019 to 0.120;

wherein a specific resistance is $1 \times 10^{-2}$ Ohm cm or less and is applied to a metal plate for cooling;

wherein the oxide sintered body comprises a main phase of one of a crystal phase of indium oxide having a bixbyite type structure with titanium contained in solid solution, and of a mixture of a crystal phase of indium oxide having a bixbyite type structure with titanium contained in solid solution and a crystal phase of an indium titanate compound, and wherein a crystal phase of titanium oxide is not detected by powder X-ray diffraction measurement.

5. A sputtering target according to claim 4 for use in manufacturing a transparent conductive film having a specific resistance $1 \times 10^{-3}$ Ohm cm or less.

6. A sputtering target according to claim 4 for use in manufacturing a low resistant, transparent conductive film having a specific resistance $5.5 \times 10^{-4}$ Ohm cm or less.

7. A sputtering target according to claim 4 for use in manufacturing a transparent conductive film having an average transmittance of infrared rays in the wavelength range from 1000 nm to 1400 nm is at least 60% for the film itself.

8. A method for providing an oxide sintered body, the oxide sintered body consisting essentially of indium oxide, and titanium, wherein the titanium is contained such that an atomic ratio of Ti/In is in a range of greater than 0.019 to 0.120 and wherein a specific resistance is $1 \times 10^{-2}$ Ohm cm or less, the method comprising the steps of:

producing raw materials of indium oxide powder and titanium oxide powder having an average particle size of 1 µm or less;

mixing the raw materials in a wet mill;

forming the mixed raw materials with a cold isostatic press, and sintering the formed and mixed raw materials under oxygen-control;

such that the oxide sintered body comprises a main phase of one of a crystal phase of indium oxide having a bixbyite type structure with titanium contained in solid solution, and of a mixture of a crystal phase of indium oxide having a bixbyite type structure with titanium contained in solid solution and a crystal phase of an indium titanate compound, and a crystal phase of titanium oxide is not detected by powder X-ray diffraction measurement from the oxide sintered body.

9. A method of manufacturing an oxide transparent electrode film, the method comprising the steps of:

using a sputtering target, the spattering target comprising an oxide sintered body consisting essentially of indium oxide, and titanium, wherein the titanium is contained such that an atomic ratio of Ti/In is in a range of greater than 0.019 to 0.120, wherein the specific resistance is $1 \times 10^{-2}$ Ohm cm or less and using a DC sputtering method for forming the film;

wherein the oxide sintered body comprises a main phase of one of a crystal phase of indium oxide having a bixbyite type structure with titanium contained in solid solution, and of a mixture of a crystal phase of indium oxide having a bixbyite type structure with titanium contained in solid solution and a crystal phase of an indium titanate compound, and wherein a crystal phase of titanium oxide is not detected by powder X-ray diffraction measurement.

* * * * *